(12) United States Patent
Furihata et al.

(10) Patent No.: US 11,270,609 B2
(45) Date of Patent: Mar. 8, 2022

(54) DEVICE AND METHOD FOR SETTING DISPLAY DRIVER

(71) Applicant: SYNAPTICS INCORPORATED, San Jose, CA (US)

(72) Inventors: Hirobumi Furihata, Tokyo (JP); Kazutoshi Aogaki, Tokyo (JP); Tomoo Minaki, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 84 days.

(21) Appl. No.: 16/451,695

(22) Filed: Jun. 25, 2019

(65) Prior Publication Data

US 2020/0005693 A1 Jan. 2, 2020

(30) Foreign Application Priority Data

Jun. 29, 2018 (JP) .............................. JP2018-124094

(51) Int. Cl.
| | |
|---|---|
| *G09G 3/00* | (2006.01) |
| *G06T 7/90* | (2017.01) |
| *G09G 3/3225* | (2016.01) |
| *G09G 3/3208* | (2016.01) |
| *G09G 3/36* | (2006.01) |

(52) U.S. Cl.
CPC ........... *G09G 3/006* (2013.01); *G09G 3/3225* (2013.01); *G06T 7/90* (2017.01); *G06T 2207/20081* (2013.01); *G09G 3/3208* (2013.01); *G09G 3/36* (2013.01); *G09G 2310/0232* (2013.01); *G09G 2320/02* (2013.01); *G09G 2320/0233* (2013.01); *G09G 2320/0242* (2013.01); *G09G 2320/0295* (2013.01); *G09G 2320/0693* (2013.01); *G09G 2360/147* (2013.01); *G09G 2360/16* (2013.01)

(58) Field of Classification Search
CPC ................. G09G 3/006; G09G 3/3225; G09G 2320/0295; G09G 2320/0233; G09G 3/2092; G09G 2320/0242; G09G 2320/046; G09G 2320/0693; G09G 3/3208; G09G 3/36; G09G 2320/02; G09G 2310/0232; G09G 2360/147; G09G 2360/16; G06T 2207/20081; G06T 7/90
See application file for complete search history.

(56) References Cited

U.S. PATENT DOCUMENTS

| | | | |
|---|---|---|---|
| 2006/0061593 A1* | 3/2006 | Miura | G09G 3/22 345/612 |
| 2017/0359574 A1* | 12/2017 | Gilmutdinov | H04N 19/50 |
| 2019/0073962 A1* | 3/2019 | Aflatooni | G09G 3/3275 |
| 2019/0191150 A1* | 6/2019 | Zhang | G09G 3/006 |
| 2019/0237001 A1* | 8/2019 | Lin | G09G 3/3208 |

* cited by examiner

*Primary Examiner* — Patrick N Edouard
*Assistant Examiner* — Douglas M Wilson
(74) *Attorney, Agent, or Firm* — Ferguson Braswell Fraser Kubasta PC

(57) ABSTRACT

A system and method for generate mura correction data comprises obtaining brightness values of a pixel-existing area and a pixel-absent area of a display panel. Further, updated brightness values are generated by replacing the brightness value of the pixel-absent area with a suitable value. Mura correction data is generated using the updated brightness values. A display driver is configured with the mura correction data for updating a display device.

22 Claims, 10 Drawing Sheets

Fig. 2
Displayed Image for
Original Image Data
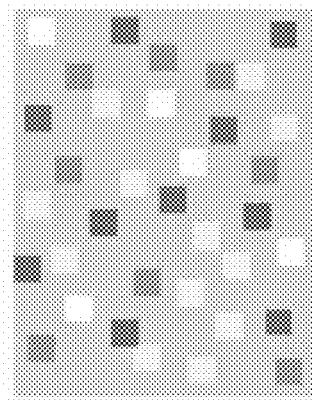
Displayed Image for
Mura-corrected
Image Data
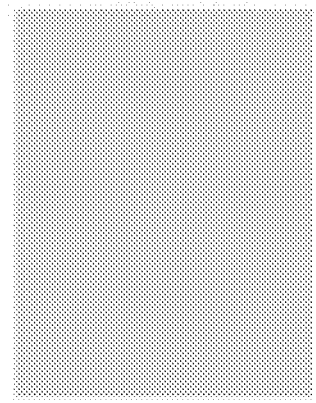

DEVICE AND METHOD FOR SETTING DISPLAY DRIVER

CROSS REFERENCE

This application claims priority to Japanese Patent Application No. 2018-124094, filed on Jun. 29, 2018, the disclosure of which is incorporated herein by reference in its entirety.

BACKGROUND

Field

The present disclosure relates to a device and method for setting a display driver.

Description of the Related Art

Display panels such as organic light emitting diode (OLED) display panels and liquid crystal display (LCD) panels may experience variations in pixel characteristics resulting from the manufacturing process. Variations in the pixel characteristics may cause mura in a displayed image. However, by performing mura correction in a driver of a display panel or a display device, the image quality of a displayed image may be improved.

SUMMARY

In one or more embodiments, a method comprises obtaining brightness values of a pixel-existing area and a pixel-absent area of a display panel. The method further comprises generating updated brightness values by replacing at least one of the brightness values of the pixel-absent area with a suitable value. Additionally, the method comprises generating mura correction data based on the updated brightness values. The method further comprises configuring a display driver with the mura correction data for updating the display panel.

In one embodiment, a non-transitory tangible storage medium storing a program when executed causes a processor to perform a method comprising obtaining brightness values of a pixel-existing area and a pixel-absent area of a display panel. The method further comprises generating updated brightness values by replacing at least one of the brightness values of the pixel-absent area with a suitable value. Additionally, the method comprises generating mura correction data based on the updated brightness values. The method further comprises configuring a display driver with the mura correction data for updating the display panel.

In one or more embodiments, a display driver setting apparatus comprises a processor and an interface. The processor is configured to obtain brightness values of a pixel-existing area and a pixel-absent area of a display panel. The processor is further configured to generate updated brightness values by replacing at least one of the brightness values of the pixel-absent area with a suitable value. Additionally, the processor is configured to generate mura correction data based on the updated brightness values, and generate compressed mura correction data by compressing the mura correction data. The interface is configured to supply the compressed mura correction data to a display driver configured to display the display panel.

In one embodiment, a display driver comprising a non-volatile memory, decompression circuitry, image processing circuitry, and driver circuitry. The non-volatile memory is configured to store compressed mura correction data. The decompression circuitry is configured to generate decompressed mura correction data by decompressing the compressed mura correction data. The image processing circuitry is configured to correct an image data based on the decompressed mura correction data. The driver circuitry is configured to drive a display panel based on the corrected image data.

BRIEF DESCRIPTION OF THE DRAWINGS

So that the manner in which the above recited features of the present disclosure may be understood in detail, a more particular description of the disclosure, briefly summarized above, may be had by reference to embodiments, some of which are illustrated in the appended drawings. It is to be noted, however, that the appended drawings illustrate only some embodiments of this disclosure and are therefore not to be considered limiting of its scope, for the disclosure may admit to other equally effective embodiments.

FIG. 2 schematically illustrates mura correction, according to one or more embodiments.

DETAILED DESCRIPTION

Figure 1:
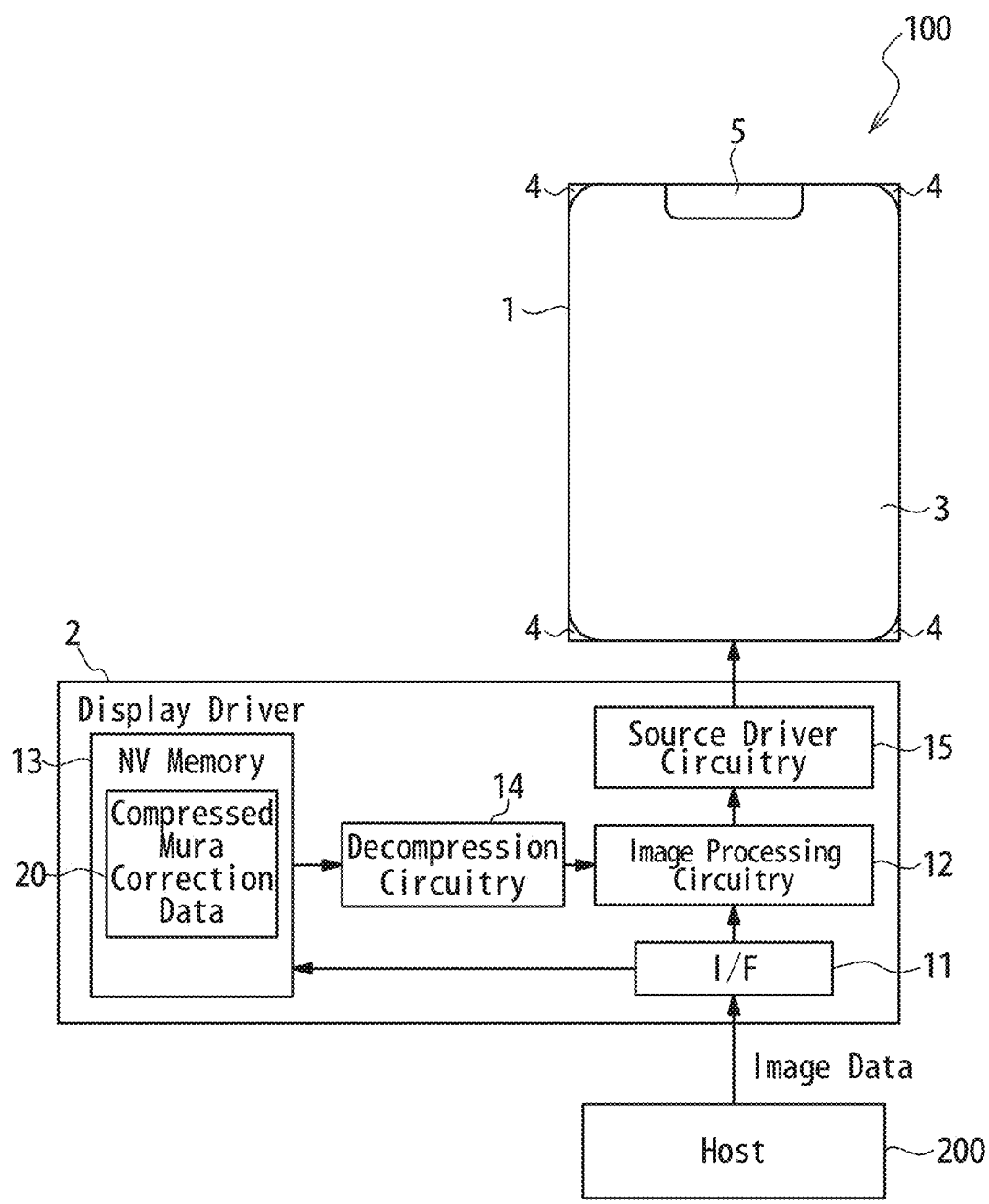
FIG. 1 is a block diagram illustrating one example configuration of a display module, according to one or more embodiments.

In one or more embodiments, as illustrated in FIG. 1, a display module 100 comprises a display panel 1 and a display driver 2. In one or more embodiments, an OLED display panel may be used as the display panel 1. In one or more embodiments, the display panel 1 comprises R pixels configured to display red, G pixels configured to display green, and B pixels configured to display blue.

In one or more embodiments, a pixel-existing area 3, in which the pixels are provided on the display panel 1, is not rectangular. In one or more embodiments, pixel-absent areas 4, in which no pixels exist, are provided at the corners of the display panel 1, and thereby the corners of the pixel-existing area 3 are rounded. Additionally, a pixel-absent area 5, in which no pixels exist either, is provided along an upper edge of the display panel 1, and thereby a notch is formed in the pixel-existing area 3.

In one or more embodiments, the display driver 2 is configured to receive an image data from a host 200 and drive the respective pixels of the display panel 1 based on the received image data. In one or more embodiments, the image data describes grayscale values of the respective pixels of the display panel 1. In one or more embodiments, the display driver 2 comprises an interface 11, image processing circuitry 12, a non-volatile memory 13, decompression circuitry 14, and source driver circuitry 15.

In one or more embodiments, the interface 11 is configured to receive various data from outside of the display driver 2 and forward the same to desired circuitry. In one or more embodiments, the interface 11 is configured to forward the image data received from the host 200 to the image processing circuitry 12. In one or more embodiments, the interface 11 is further configured to write externally-received data into the non-volatile memory 13 in accordance with the necessity.

In one or more embodiments, the image processing circuitry 12 is configured to perform desired image processing on the image data received from the host 200. In one or more embodiments, the image processing performed in the image processing circuitry 12 comprises mura correction (or demura processing). In one or more embodiments, mura correction for an image data associated with a target pixel involves correcting the image data based on a mura correction data generated based on the characteristics of the target pixel. Referring to FIG. 2, when the target pixel is manufactured to exhibit a reduced brightness level in the manufacturing process, in one or more embodiments, the mura correction data associated with the target pixel is generated to perform mura correction to increase the brightness level of the target pixel. When the target pixel is manufactured to exhibit an increased brightness level in the manufacturing process, in one or more embodiments, the mura correction data associated with the target pixel is generated to perform mura correction to decrease the brightness level of the target pixel. Such mura correction effectively cancels the variations in the pixel characteristics, suppressing mura in the displayed image.

Referring back to FIG. 1, the non-volatile memory 13 is configured to store mura correction data used for the mura correction performed in the image processing circuitry 12, in one or more embodiments. In one or more embodiments, compressed mura correction data 20 obtained by compressing the mura correction data is stored in the non-volatile memory 13, not in the original form of the mura correction data.

The decompression circuitry 14 is configured to generate decompressed mura correction data by decompressing the compressed mura correction data 20 read out from the non-volatile memory 13 and supply the decompressed mura correction data to the image processing circuitry 12. The decompressed mura correction data is used in the mura correction in the image processing circuitry 12.

In one or more embodiments, the source driver circuitry 15 is configured to receive an image data generated by the image processing in the image processing circuitry 12 and drive the respective pixels of the display panel 1 based on the received image data.

In one or more embodiments, the display driver 2 is configured to output drive signals to the display panel 1 in such a matter that an image is displayed in a rectangular area encompassing the pixel-existing area 3 of the display panel 1, for example, a rectangular area circumscribing the pixel-existing area 3, although the pixel-existing area 3 is not actually rectangular. In one or more embodiments, the display driver 2 is configured to output the drive signals under an assumption that pixels are hypothetically defined also in the pixel-absent areas 4 and 5, although no pixels actually exist in the pixel-absent areas 4 and 5. This may simplify the configuration of the display driver 2. Since no pixels actually exist in the pixel-absent areas 4 and 5, this operation eventually displays an image only in the pixel-existing area 3.

Pixels hypothetically defined in the pixel-absent areas 4 and 5 may be hereinafter referred to as hypothetical pixels. Similarly, R, G, and B pixels hypothetically defined in the pixel-absent areas 4 and 5 may be hereinafter referred to as hypothetical R, G, and B pixels, respectively.

In one or more embodiments, the image data supplied to the display driver 2 from the host 200 comprises image data associated with the hypothetical pixels of the pixel-absent areas 4 and 5 in addition to those associated with the pixels of the pixel-existing area 3. In view of this, in one or more embodiments, the image processing circuitry 12 is configured to perform mura correction on the image data associated with the hypothetical pixels of the pixel-absent areas 4 and 5 in addition to those associated with the pixels of the pixel-existing area 3.

Figure 3:
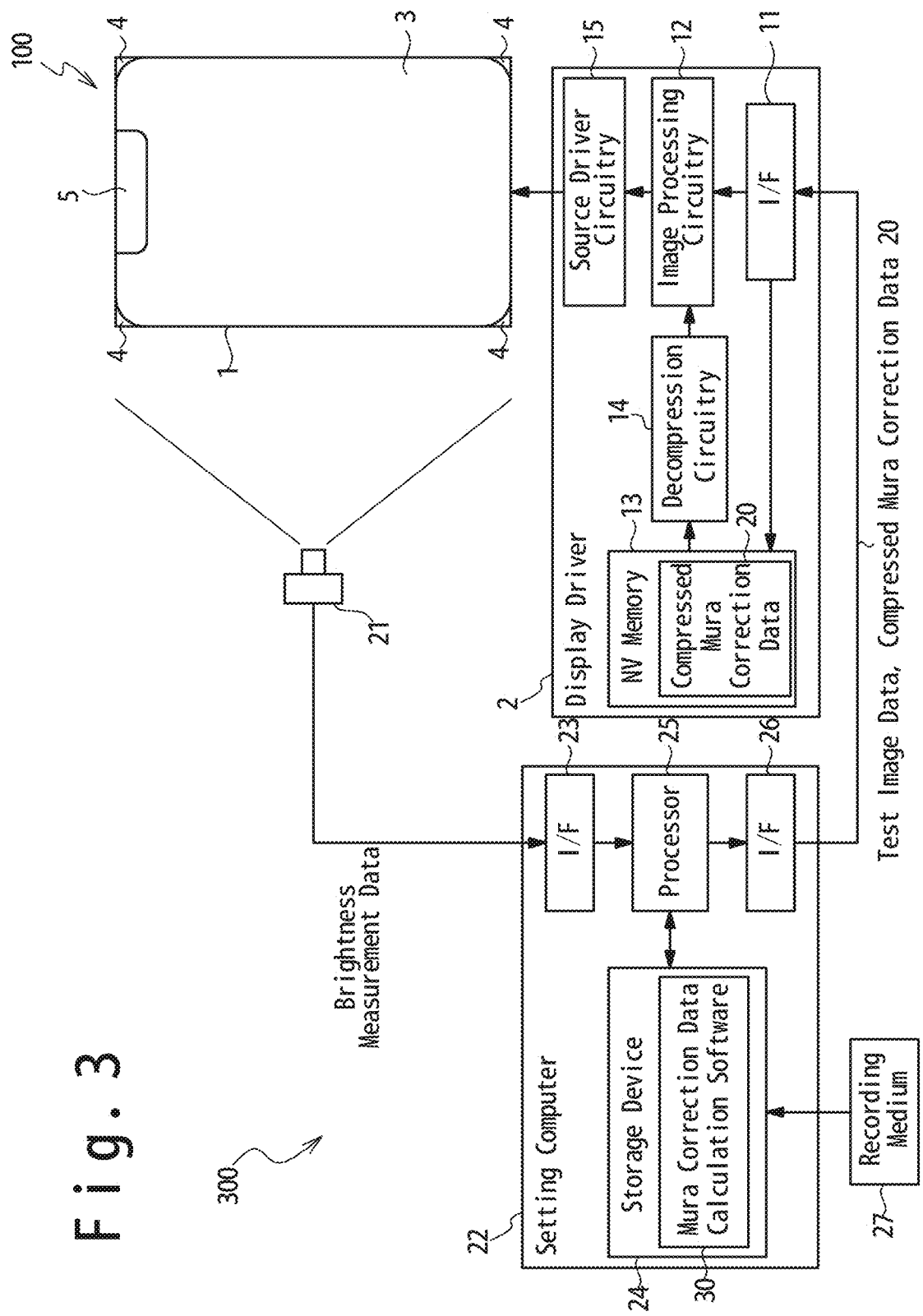
FIG. 3 is a block diagram illustrating one example configuration of a display driver setting apparatus, according to one or more embodiments.

Referring to FIG. 3, in one or more embodiments, the compressed mura correction data 20 are supplied to the display driver 2 and stored in the non-volatile memory 13 in a testing process of the display module 100. In one or more embodiments, the compressed mura correction data 20 are generated by the display driver setting apparatus 300 in the testing process. The generated compressed mura correction data 20 are supplied to the interface 11 of the display driver 2 and then transferred to the non-volatile memory 13.

The display driver setting apparatus 300 is configured to obtain brightness values of the pixel-existing area 3 and the pixel-absent areas 4 and 5 of the display panel 1 in the testing process of the display module 100. In one or more embodiments, the display driver setting apparatus 300 comprises an imaging device 21 and a setting computer 22. The imaging device 21 is configured to capture an image of the display panel 1. In one or more embodiments, a coverage area for which the image is captured on the display panel 1 is rectangular, and the coverage area incorporates the pixel-absent areas 4 and 5 in addition to the pixel-existing area 3. In one or more embodiments, the setting computer 22 is configured to obtain brightness measurement data describing brightness values of the respective pixels and the respective hypothetical pixels from the image captured by the imaging device 21. In one or more embodiments, the setting computer 22 is further configured generate mura correction data from the brightness measurement data and generate the compressed mura correction data 20 by compressing the mura correction data thus generated.

In one or more embodiments, the setting computer 22 is configured to generate the mura correction data and the compressed mura correction data 20 through software processing. In one or more embodiments, the setting computer 22 comprises an interface 23, a storage device 24, a processor 25, and an interface 26.

In one or more embodiments, the interface 23 is configured to receive the brightness measurement data from the imaging device 21 and supply to the imaging device 21 control data for controlling the imaging device 21.

In one or more embodiments, the storage device 24 is configured to store various data used for generating the mura correction data and the compressed mura correction data 20. In one or more embodiments, mura correction data calculation software 30 is installed on the storage device 24; the storage device 24 is used as a non-transitory tangible storage medium storing the mura correction data calculation software 30. The mura correction data calculation software 30 may be offered in the form of a computer program product recorded in a computer-readable recording medium 27, or in the form of a computer program product downloadable from a server.

In one or more embodiments, the processor 25 is configured to execute the mura correction data calculation software 30 to achieve various data processing operations for the generation of the mura correction data and the compressed mura correction data 20. In one or more embodiments, the processor 25 is further configured to generate a test image data corresponding to a test image to be displayed on the display panel 1 when the brightness values of the pixel-existing area 3 and the pixel-absent areas 4, 5 are obtained in the testing process and supply the generated test image data to the display driver 2. In one or more embodiments, the processor 25 is further configured to generate the control data to control the imaging device 21 and supply the same to the imaging device 21. In one or more embodiments, the imaging device 21 is configured to capture an image under the control of the control data. In one or more embodiments, the processor 25 is further configured to generate the brightness measurement data from the image captured by the imaging device 21 and generate the mura correction data from the brightness measurement data. In one or more embodiments, the processor 25 is further configured to generate the compressed mura correction data 20 by compressing the mura correction data thus generated.

In one or more embodiments, the interface 26 is configured to supply to the display driver 2 the test image data and the compressed mura correction data 20 generated by the processor 25.

In one or more embodiments, the mura correction data generated by the display driver setting apparatus 300 comprise those used for mura correction of the image data associated with the hypothetical pixels of the pixel-absent areas 4 and 5 in addition to those used for mura correction of the image data associated with the pixels of the pixel-existing area 3. In one or more embodiments, the coverage area for which the imaging device 21 captures an image on the display panel 1 is rectangular; and the imaging device 21 is configured to capture the image of the display panel 1 so that the coverage area incorporates the pixel-absent areas 4 and 5 of the display panel 1 in addition to the pixel-existing area 3. In one or more embodiments, the processor 25 is configured to generate the brightness measurement data, which describe the brightness values of the pixels of the pixel-existing area 3 and those of the hypothetical pixels of the pixel-absent areas 4 and 5, from the image thus captured. In one or more embodiments, the brightness measurement data describe brightness values at positions where the pixels are located in the pixel-existing area 3 and further describe brightness values at positions where the hypothetical pixels are defined in the pixel-absent areas 4 and 5. In one or more embodiments, the processor 25 is further configured to generate the mura correction data associated with the hypothetical pixels of the pixel-absent areas 4 and 5 in addition to the mura correction data associated with the pixels of the pixel-existing area 3, based on the generated brightness measurement data.

Figure 4:
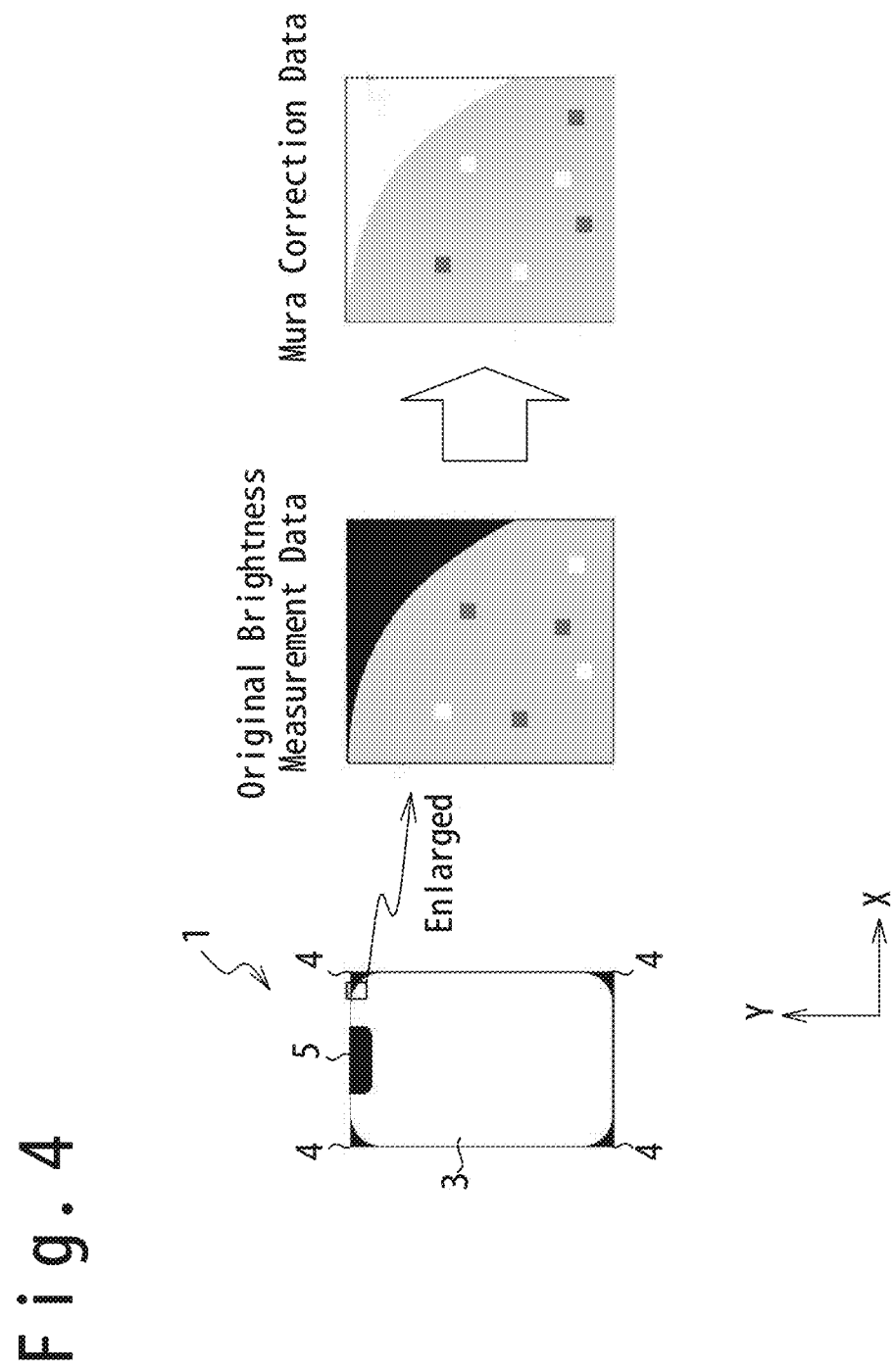
FIG. 4 schematically illustrates example contents of brightness measurement data and mura correction data, according to one or more embodiments.

In one or more embodiments, to reduce the hardware size for storing the compressed mura correction data 20 in the display driver 2, the mura correction data is generated so that the compression ratio in the generation of the compressed mura correction data 20 is increased. Referring to FIG. 4, since no pixels actually exist in the pixel-absent areas 4 and 5, brightness measurement data which describes brightness values of zero or those close to zero may be obtained from the captured image for respective positions in the pixel-absent areas 4 and 5, while brightness measurement data which describes brightness values apart from zero may be obtained for respective positions in the pixel-existing area 3. To improve the compression ratio of the mura correction data, in one or more embodiments, brightness measurement data obtained by a replacement process is used to generate the mura correction data in place of the original brightness measurement data obtained from the captured image. In one or more embodiments, the replacement process involves replacing the brightness value of at least one hypothetical pixel of the pixel-absent areas 4 and 5 in the original brightness measurement data with a "suitable" value. This replacement process may reduce variations in the brightness values at the boundaries between the pixel-existing area 3 and the pixel-absent areas 4 and 5 and thereby reduce variations in the mura correction data. This may improve the compression ratio of the mura correction data. A detailed description will be given later of a method of determining the "suitable" value for reducing the variations in the mura correction data. The replacement process may also contribute improvement in the image quality, because the replacement process reduces compression distortion of the mura correction data through reduction in the variations in the mura correction data. In the following, a detailed description is given of the generation of the mura correction data and the setting of the compressed mura correction data 20 to the display driver 2, according to one or more embodiments.

Figure 5:
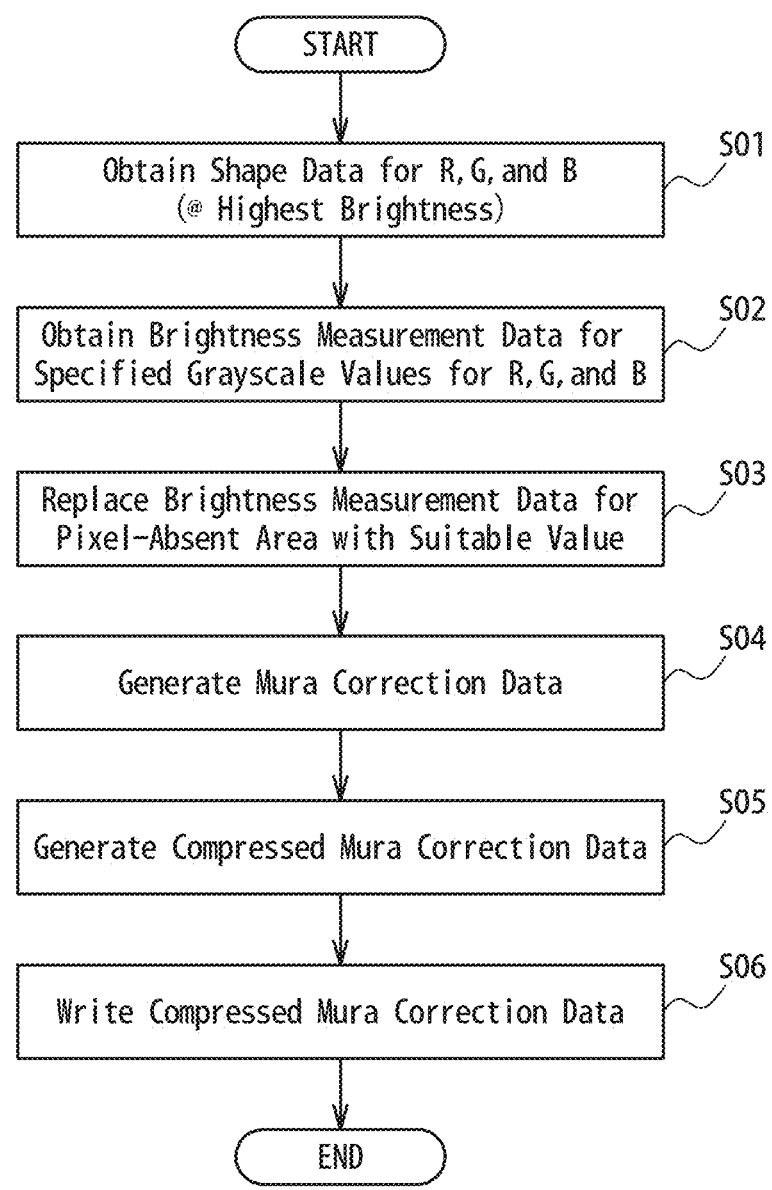
FIG. 5 is a flowchart illustrating a method of setting a display driver, according to one or more embodiments.

As illustrated in FIG. 5, in one or more embodiments, shape data representing the shape of the pixel-existing area 3 are respectively obtained for the R pixels, the G pixels, and the B pixels in step S01. Various pixel structures may be used for the display panel 1, and therefore the shape of the pixel-existing area 3 may be different among the R pixels, the G pixels, and the B pixels, especially when an OLED display panel is used as the display panel 1. In view of this, the shape data is respectively obtained for the R pixels, the G pixels, and the B pixels, in one or more embodiments. In the following, the shape data representing the shape of the pixel-existing area 3 for the R pixels may be referred to as R shape data. Similarly, the shape data representing the shape of the pixel-existing area 3 for the G pixels may be referred to as G shape data, and the shape data representing the shape of the pixel-existing area 3 for the B pixels may be referred to as B shape data.

Figure 6:
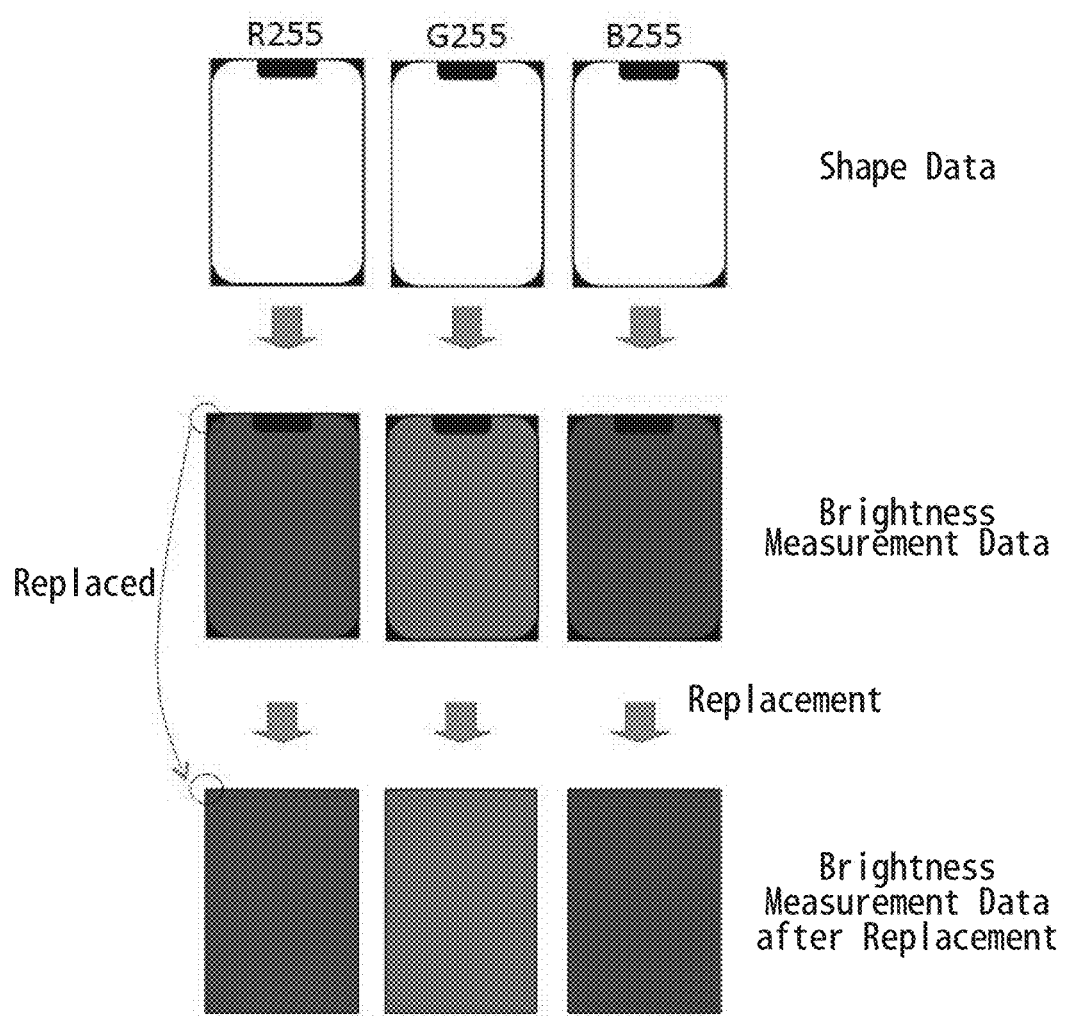
FIG. 6 schematically illustrates example contents of shape data, brightness measurement data, and brightness measurement data after a replacement process, according to one or more embodiments.

In one or more embodiments, the R shape data is obtained as follows. Referring to FIG. 6, a test image data which drives all the R pixels of the display panel 1 to be of the highest brightness level and drives all the G and B pixels to be of the lowest brightness level is supplied to the display driver 2 from the setting computer 22 of the display driver setting apparatus 300 in one or more embodiments. In one or more embodiments, the test image data specifies the grayscale values of all the R pixels as the highest grayscale value, for example, "255" and specifies the grayscale values of all the G and B pixels as the lowest grayscale value, for example, "0." This results in supplying drive signals corresponding to the highest grayscale value to the R pixels to drive the R pixels to be of the highest brightness level and supplying drive signals corresponding to the lowest grayscale value to the G and B pixels to drive the G and B pixels to be of the lowest brightness level, in one or more embodiments. In one or more embodiments, an image is captured by the imaging device 21 in the state in which all the R pixels of the display panel 1 are driven to be of the highest brightness level and all the G and B pixels are driven to be of the lowest brightness level. In one or more embodiments, a brightness measurement data is generated based on the image thus captured, and the R shape data, which represents the shape of the pixel-existing area 3 for the R pixels, is generated based on the brightness measurement data thus generated. In one or more embodiments, the R shape data is generated so that the R shape data defines the pixel-existing area 3 as an area in which pixels of the highest brightness level or brightness levels higher than a predetermined brightness level close to the highest brightness level are arranged and defines the pixel-absent areas 4 and 5 as an area in which pixels of a brightness level of zero or brightness levels lower than a predetermined brightness level close to zero are arranged.

In one or more embodiments, G and B shape data is obtained in a similar way. When the G shape data is obtained, in one or more embodiments, an image is captured by the imaging device 21 in the state in which all the G pixels of the display panel 1 are driven to be of the highest brightness level and all the B and R pixels are driven to be of the lowest brightness level. A brightness measurement data is generated based on the image thus captured, and the G shape data is generated based on the brightness measurement data thus generated. Similarly, when the B shape data is obtained, in one or more embodiments, an image is captured by the imaging device 21 in the state in which all the B pixels of the display panel 1 are driven to be of the highest brightness level and all the R and G pixels are driven to be of the lowest brightness level. A brightness measurement data is generated based on the image thus captured, and the B shape data is generated based on the brightness measurement data thus generated.

Referring back to FIG. 5, in step S02 following step S01, brightness measurement data is obtained while the R, G, and B pixels are individually driven with specified grayscale values, in one or more embodiments. In one or more embodiments, a brightness measurement data for the R pixels is obtained in a state in which drive signals corresponding to a specified grayscale value are supplied to the R pixels and drive signals corresponding to the lowest brightness level, that is, the lowest grayscale value are supplied to the G and B pixels. The brightness measurement data thus obtained may be hereinafter referred to as R brightness measurement data. In one or more embodiments, a brightness measurement data for the G pixels is obtained in a state in which drive signals corresponding to a specified grayscale value are supplied to the G pixels and drive signals corresponding to the lowest brightness level, that is, the lowest grayscale value are supplied to the B and R pixels. The brightness measurement data thus obtained may be hereinafter referred to as G brightness measurement data. In one or more embodiments, a brightness measurement data for the B pixels is obtained in a state in which drive signals corresponding to a specified grayscale value are supplied to the B pixels and drive signals corresponding to the lowest brightness level, that is, the lowest grayscale value are supplied to the R and G pixels. The brightness measurement data thus obtained may be hereinafter referred to as B brightness measurement data.

In one or more embodiments, the R brightness measurement data, the G brightness measurement data, and the B brightness measurement data is obtained for a plurality of grayscale values. An R brightness measurement data for a certain grayscale value is obtained in a state in which drive signals corresponding to the grayscale value are supplied to the R pixels and drive signals corresponding to the lowest brightness level, that is, the lowest grayscale value are supplied to the G and B pixels. The similar goes for the G brightness measurement data, and the B brightness measurement data. When a brightness measurement data is obtained in step S01 in the state in which drive signals corresponding to the highest grayscale value are supplied to all the R pixels and drive signals corresponding to the lowest grayscale value are supplied to all the G and B pixels, the brightness measurement data thus obtained may be used as the R brightness measurement data corresponding to the highest grayscale value. The similar goes for the G brightness measurement data and the B brightness measurement data.

In one or more embodiments, in step S03 following step S02, a replacement process is performed to replace the brightness values of the hypothetical pixels of the pixel-absent areas 4 and 5 with a predetermined "suitable value" for each of the R brightness measurement data, the G brightness measurement data, and the B brightness measurement data corresponding to each grayscale value. Referring to FIG. 6, the shape data obtained in step S01 are used in this replacement process, in one or more embodiments. In one or more embodiments, in the replacement process for the R brightness measurement data, the brightness values of the hypothetical R pixels of the pixel-absent areas 4 and 5 are identified based on the R shape data, and the brightness values of the hypothetical R pixels are replaced with a "suitable value." In one or more embodiments, in the replacement process for the G brightness measurement data, the brightness values of the hypothetical G pixels of the pixel-absent areas 4 and 5 are identified based on the G shape data, and the brightness values of the hypothetical G pixels are replaced with a "suitable value." In one or more embodiments, in the replacement process for the B brightness measurement data, the brightness values of the hypothetical B pixels of the pixel-absent areas 4 and 5 are identified based on the B shape data, and the brightness values of the hypothetical B pixels are replaced with a "suitable value." In one or more embodiments, the shape data obtained in step S01 are used for all the specified grayscale values in the replacement process in step S03. The use of the shape data, which are obtained in the state in which the pixels are driven to be of the highest brightness level, makes it possible to accurately identify the brightness values of the pixel-absent areas 4 and 5.

In one or more embodiments, the "suitable value" may be determined based on the grayscale value described in the test image data. The suitable value used in the replacement process for an R brightness measurement data corresponding to a certain grayscale value may be determined based on the grayscale value of the R pixels described in the test image data used for obtaining the captured image used for generating the R brightness measurement data. In one or more embodiments, the similar applies to the suitable values used in the replacement processes for the G brightness measurement data and the B brightness measurement data.

In one or more embodiments, the "suitable value" corresponding to a certain grayscale value may be determined as a brightness value expected for pixels hypothetically existing in the pixel-absent areas 4 and 5 when the hypothetically-existing pixels are supplied with drive signals corresponding to the grayscale value. For example, when the grayscale value of the R pixels are described as a value from "0" to "255" in the test image data supplied to the display driver 2 in obtaining the R brightness measurement data and the brightness values of the R pixels are described as values from "0" to "255" in the R brightness measurement data, the "suitable value" may be determined as being identical to the grayscale value of the R pixels described in the test image data. In one or more embodiments, the similar applies to the G brightness measurement data and the B brightness measurement data.

Referring back to FIG. 5, in step S04 following step S03, mura correction data is generated based on the R, G, and B brightness measurement data obtained by the replacement process in step S03, in one or more embodiments. In one or more embodiments, the mura correction data associated with the R pixels are generated from the R brightness measurement data. In one or more embodiments, the mura correction data associated with the G pixels are generated from the G brightness measurement data, and the mura correction data associated with the B pixels are generated from the B brightness measurement data.

In step S05, the compressed mura correction data 20 are generated by compressing the mura correction data, in one or more embodiments.

In step S06, the compressed mura correction data 20 are transferred to the display driver 2 from the display driver setting apparatus 300 and written into the non-volatile memory 13 of the display driver 2, in one or more embodiments. This completes setting the compressed mura correction data 20 to the display driver 2, in one or more embodiments.

As thus described, in one or more embodiments, variations in the mura correction data is reduced to improve the compression ratio of the mura correction data through the replacement process which replaces the brightness values of the hypothetical pixels of the pixel-absent areas 4 and 5 with a suitable value. This may effectively reduce the size of the compressed mura correction data 20, making it possible to reduce the capacity of the non-volatile memory 13. Such replacement process may also improve the image quality, since the reduction in the variations in the mura correction data reduces the compression distortion of the mura correction data.

In one or more embodiments, a common shape data may be obtained for the R pixels, the G pixels, and the B pixels in step S01, when the shape of the pixel-existing area 3 can be considered as the same for the R pixels, the G pixels, and the B pixels. In this case, in one or more embodiments, an image is captured in a state in which all the pixels of the display panel 1 are driven to be of the highest brightness level, a brightness measurement data describing the brightness values of the respective pixels is generated from the captured image, and a common shape data is generated from the brightness measurement data thus generated. In such an embodiment, the common shape data is used to identify the brightness values of the hypothetical pixels of the pixel-absent areas 4 and 5 for all the R, G, and B brightness measurement data in the replacement process in step S03.

Figure 7:
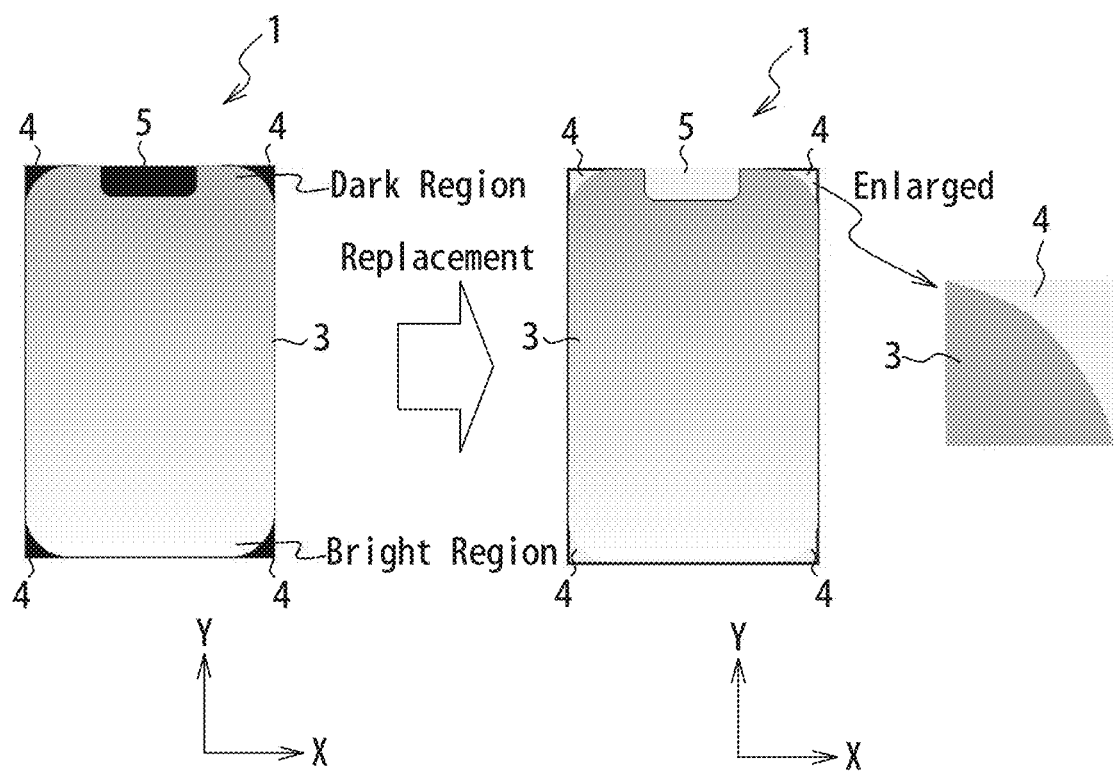
FIG. 7 schematically illustrates brightness values described in original brightness measurement data and those described in brightness measurement data after the replacement process, according to one or more embodiments.

The "suitable value" used in the replacement process in step S03 may be determined based on the position of the corresponding hypothetical pixel in the vertical direction in the display panel 1; the vertical direction referred herein is the direction in which the source lines are extended in the display panel 1, indicated as the Y axis direction of the XY Cartesian coordinate system in FIG. 7. The brightness values of the pixels of the display panel 1 may depend on the positions of the pixels in the vertical direction, depending on the resistances of the source lines and the drive capability of the source driver circuitry 15. In such a case, the compression ratio of the mura correction data may be improved by determining the "suitable value" based on the position of the corresponding hypothetical pixel in the vertical direction of the display panel 1. In one or more embodiments, when an OLED display panel is used as the display panel 1, a suitable value representing a reduced brightness level is used in a replacement process for a hypothetical pixel positioned away from the display driver 2, and a suitable value representing an increased brightness level is used in a replacement process for a hypothetical pixel positioned close to the display driver 2.

In one or more embodiments, the "suitable value" used in the replacement process for a hypothetical pixel is calculated based on the brightness value of a pixel of the pixel-existing area 3 positioned in the horizontal direction with respect to the hypothetical pixel, to determine the "suitable value" used in the replacement process depending on the position of the hypothetical pixel. The "horizontal direction" referred herein is the direction orthogonal to the above-described vertical direction, indicated as the X axis direction of the XY Cartesian coordinate system in FIG. 7. In one or more embodiments, a "suitable value" is individually calculated for each of the hypothetical R pixels, the hypothetical G pixels, and the hypothetical B pixels.

Figure 8:
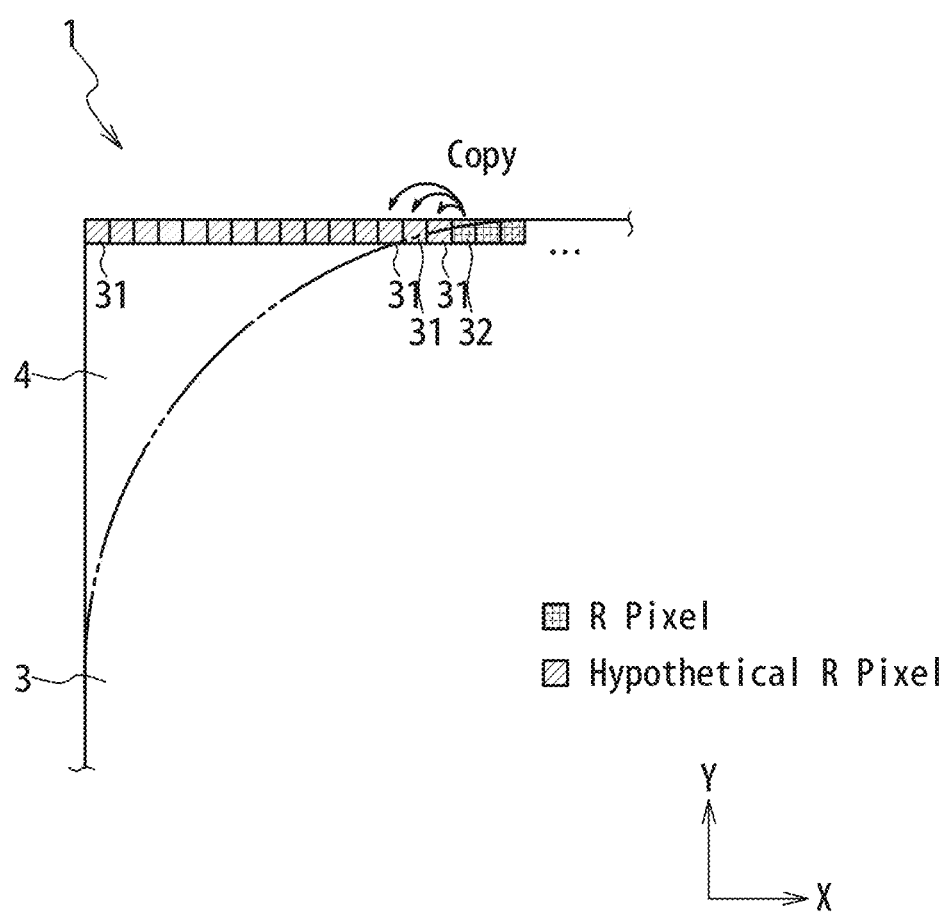
FIG. 8 illustrates determination of a suitable value used in the replacement process, according to one or more embodiments.

In one or more embodiments, a brightness value of a pixel of the pixel-existing area 3 positioned in the horizontal direction with respect to a hypothetical pixel may be copied as the "suitable value" used in the replacement process for the hypothetical pixel. As illustrated in FIG. 8, for example, in the replacement process for a hypothetical R pixel 31 defined in a pixel-absent area 4, the suitable value for the hypothetical R pixel 31 may be determined as the brightness value of an R pixel 32 positioned in the horizontal direction with respect to the hypothetical R pixel 31 within a predetermined distance from the boundary between the pixel-existing area 3 and the pixel-absent area 4. In one or more embodiments, the suitable value may be determined as the brightness value of the R pixel 32 closest to the boundary between the pixel-existing area 3 and the pixel-absent area 4. In one or more embodiments, the suitable value may be determined as the brightness value of an R pixel 32 positioned within a predetermined distance from the boundary between the pixel-existing area 3 and the pixel-absent area 4 other than the R pixel 32 closest to the boundary; for example, the suitable value may be determined as the brightness value of an R pixel 32 adjacent to the R pixel 32 closest to the boundary. The replacement process may be performed similarly for the hypothetical G pixels and the hypothetical B pixels.

Figure 9:
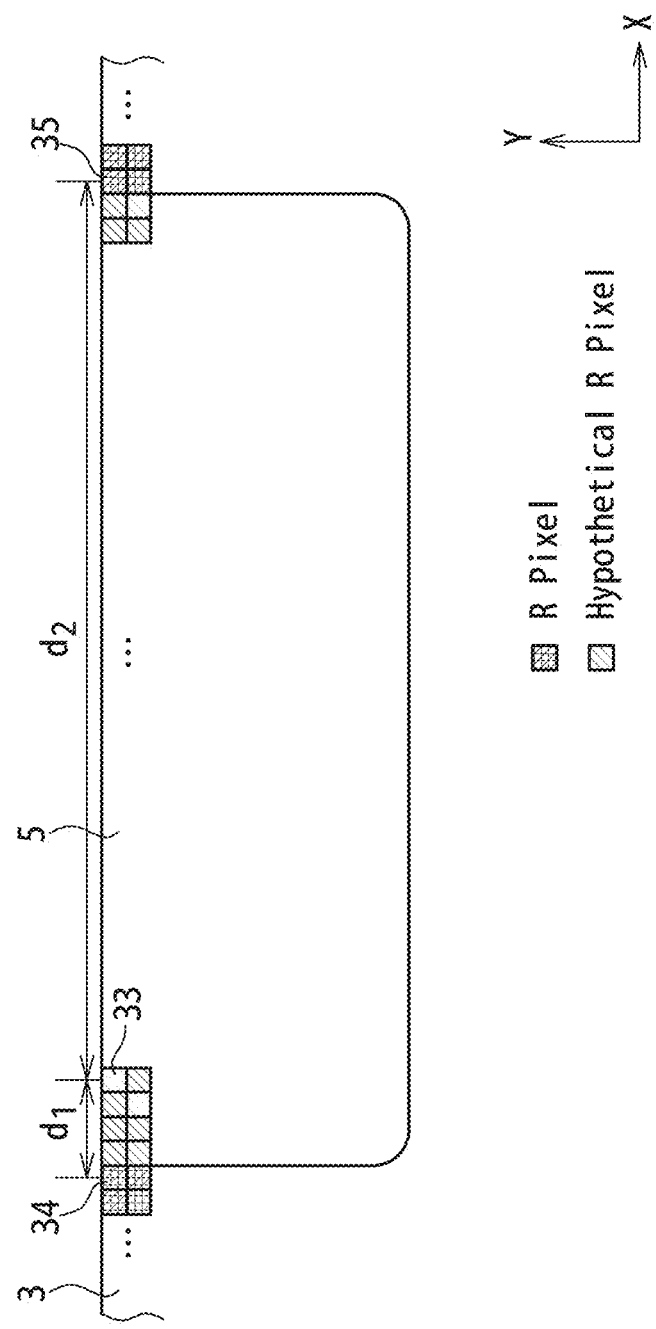
FIG. 9 illustrates calculation of a suitable value used in the replacement process, according to one or more embodiments.

When a hypothetical pixel is defined at a position sandwiched by the pixel-existing area 3 in the horizontal direction, the suitable value used in the replacement process for the hypothetical pixel may be calculated through interpolation. For example, as illustrated in FIG. 9, the suitable value used in the replacement process for a hypothetical R pixel 33 defined in the pixel-absent area 5 may be calculated through interpolation between the brightness value of an R pixel 34 positioned in the −X direction with respect to the hypothetical R pixel 33 at the boundary between the pixel-existing area 3 and the pixel-absent area 5 and that of an R pixel 35 positioned in the +X direction with respect to the hypothetical R pixel 33 at the boundary between the pixel-existing area 3 and the pixel-absent area 5. In one or more embodiments, the suitable value used in the replacement process for the hypothetical R pixel 33 may be calculated through interpolation between the brightness values of the R pixels 34 and 35 depending on the distance $d_1$ between the hypothetical R pixel 33 and the R pixel 34 and the distance $d_2$ between the hypothetical R pixel 33 and the R pixel 35. In this case, the suitable values used in the replacement processes for the hypothetical G pixels and the hypothetical B pixels may be similarly calculated.

Figure 10:
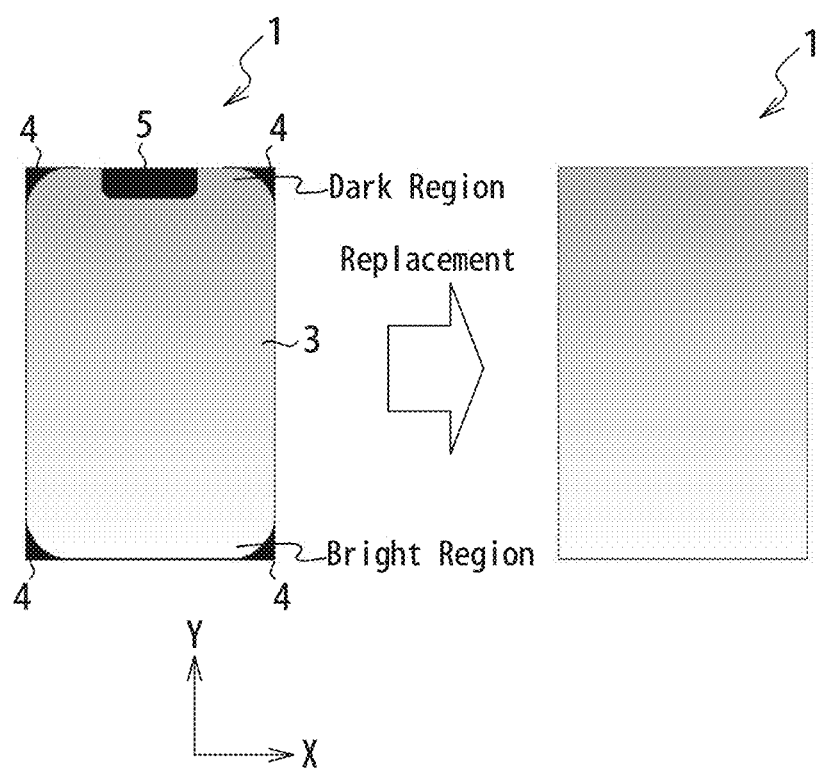
FIG. 10 schematically illustrates a distribution of brightness values described in the brightness measurement data after the replacement process, according to one or more embodiments.

Determining or calculating the "suitable values" as described above may make it possible to reduce the variations in the brightness measurement data at the boundaries between the pixel-existing area 3 and the pixel-absent areas 4 and 5 after the replacement process as illustrated in FIG. 10, effectively improving the compression ratio of the mura correction data.

Although various embodiments of this disclosure have been specifically described in the above, the technologies presented in this disclosure may be implemented with various modifications. For example, the display panel 1 may additionally comprise pixels displaying a different color from red, green and blue, for example, pixels displaying yellow or while. In this case, a shape data and brightness measurement data may be obtained for the different color and a similar process to those for the R, G, and B pixels may be performed.

What is claimed is:

1. A method, comprising:
    performing a testing process of a display panel to generate mura correction data, the testing process comprising:
        distinguishing a pixel-existing area of the display panel and a pixel-absent area of the display panel, comprising:
            comparing brightness measurements obtained from the display panel against a predetermined brightness level while displaying test image data;
            assigning a first region of the display panel where a first subset of the brightness measurements exceeds the predetermined brightness level to the pixel-existing area; and
            assigning a second display region where a second subset of the brightness measurements does not exceed the predetermined brightness level to the pixel-absent area;
        measuring brightness values of the pixel-existing area of the display panel and the pixel-absent area of the display panel;
        generating updated brightness values by replacing at least one of the brightness values of the pixel-absent area with a suitable value,
            wherein the suitable value is selected to improve a compression ratio of the mura correction data;
        generating the mura correction data based on the updated brightness values; and
    configuring a display driver with the mura correction data; and
    driving the display panel using received image data corrected using the mura correction data.

2. The method according to claim 1, wherein measuring the brightness values comprises:
    capturing an image of the pixel-existing area and the pixel-absent area while supplying drive signals corresponding to a grayscale value to pixels of the pixel-existing area; and
    obtaining the brightness values of the pixel-existing area and the pixel-absent area from the captured image,
    wherein replacing the brightness value with the suitable value comprises determining the suitable value based on the grayscale value.

3. The method according to claim 1,
    wherein the suitable value is associated with a hypothetical pixel defined in the pixel-absent area, and
    wherein replacing the brightness value with the suitable value comprises determining the suitable value based on a position of the hypothetical pixel in a vertical direction of the display panel.

4. The method according to claim 1,
    wherein the suitable value is associated with a hypothetical pixel defined in the pixel-absent area, and
    wherein replacing the brightness value with the suitable value comprises determining the suitable value based on a brightness value of a pixel of the pixel-existing area, the pixel being positioned in a horizontal direction with respect to the hypothetical pixel.

5. The method according to claim 1,
    wherein the suitable value is associated with a hypothetical pixel defined in the pixel-absent area, and
    wherein replacing the brightness value with the suitable value comprises determining the suitable value as a brightness value of a pixel of the pixel-existing area, the pixel being positioned in a horizontal direction with respect to the hypothetical pixel within a predetermined distance from a boundary between the pixel-existing area and the pixel-absent area.

6. The method according to claim 1,
    wherein the suitable value is associated with a hypothetical pixel defined in the pixel-absent area, and
    wherein replacing the brightness value with the suitable value comprises calculating the suitable value through interpolation between brightness values of a first pixel of the pixel-existing area and a second pixel of the pixel-existing area, the first pixel being positioned in a first direction parallel to a horizontal direction with respect to the hypothetical pixel at a boundary between the pixel-existing area and the pixel-absent area, and the second pixel being positioned in a second direction opposite to the first direction with respect to the hypothetical pixel at a boundary between the pixel-existing area and the pixel-absent area.

7. The method according to claim 1, further comprising:
    generating a compressed mura correction data by compressing the mura correction data; and
    writing the compressed mura correction data into the display driver configured to drive the display panel.

8. The method according to claim 7, further comprising:
    generating a decompressed mura correction data by decompressing the compressed mura correction data; and
    wherein driving the display panel using received image data corrected using the mura correction data comprises:
        correcting the received image data based on the decompressed mura correction data; and
        driving a pixel of the pixel-existing area based on the corrected image data.

9. A non-transitory tangible storage medium storing a program when executed causes a processor to perform a method comprising:
    performing a testing process of a display panel to generate mura correction data, the testing process comprising:
        distinguishing a pixel-existing area of the display panel and a pixel-absent area of the display panel, comprising:
            comparing brightness measurements obtained from the display panel against a predetermined brightness level while displaying test image data;

assigning a first region of the display panel where a first subset of the brightness measurements exceeds the predetermined brightness level to the pixel-existing area, and assigning a second display region where a second subset of the brightness measurements does not exceed the predetermined brightness level to the pixel-absent area;

measuring brightness values of the pixel-existing area and the pixel-absent area of the display panel;

generating updated brightness values by replacing at least one of the brightness values of the pixel-absent area with a suitable value, wherein the suitable value is selected to improve a compression ratio of the mura correction data;

generating the mura correction data based on the updated brightness values; and configuring a display driver with the mura correction data; and updating the display panel using the mura correction data applied to received image data.

10. The non-transitory tangible storage medium according to claim 9, wherein measuring the brightness values comprises:

displaying a test image on the display panel based on a test image data; and obtaining the brightness values of the pixel-existing area and the pixel-absent area from a captured image of the display panel, the captured image being captured while the test image is displayed on the display panel, wherein replacing the brightness value of the pixel-absent area with the suitable value comprises determining the suitable value based on a grayscale value described in the test image data.

11. The non-transitory tangible storage medium according to claim 9, wherein the suitable value is associated with a hypothetical pixel defined in the pixel-absent area, and wherein replacing the brightness value of the pixel-absent area with the suitable value comprises determining the suitable value based on a position of the hypothetical pixel in a vertical direction of the display panel.

12. The non-transitory tangible storage medium according to claim 9, wherein the suitable value is associated with a hypothetical pixel defined in the pixel-absent area, and wherein replacing the brightness value with the suitable value comprises determining the suitable value based on a brightness value of a pixel of the pixel-existing area, the pixel being positioned in a horizontal direction with respect to the hypothetical pixel.

13. The non-transitory tangible storage medium according to claim 9, wherein the suitable value is associated with a hypothetical pixel defined in the pixel-absent area, and wherein replacing the brightness value with the suitable value comprises determining the suitable value as a brightness value of a pixel of the pixel-existing area, the pixel being positioned in a horizontal direction with respect to the hypothetical pixel within a predetermined distance from a boundary between the pixel-existing area and the pixel-absent area.

14. The non-transitory tangible storage medium according to claim 9, wherein the suitable value is associated with a hypothetical pixel defined in the pixel-absent area, and wherein replacing the brightness value with the suitable value comprises calculating the suitable value through interpolation between brightness values of first and second pixels of the pixel-existing area, the first pixel being positioned in a first direction parallel to a horizontal direction with respect to the hypothetical pixel at a boundary between the pixel-existing area and the pixel-absent area, and the second pixel being positioned in a second direction opposite to the first direction with respect to the hypothetical pixel at a boundary between the pixel-existing area and the pixel-absent area.

15. The non-transitory tangible storage medium according to claim 9, wherein the method further comprises:

generating a compressed mura correction data by compressing the mura correction data; and writing the compressed mura correction data into a display driver configured to drive the display panel.

16. A display driver setting apparatus, comprising:

a processor configured to:

perform a testing process of a display panel to generate mura correction data, the testing process comprising:

distinguishing a pixel-existing area of the display panel and a pixel-absent area of the display panel, comprising:

comparing brightness measurements obtained from the display panel against a predetermined brightness level while displaying test image data, assigning a first region of the display panel where a first subset of the brightness measurements exceeds the predetermined brightness level to the pixel-existing area, and assigning a second display region where a second subset of the brightness measurements does not exceed the predetermined brightness level to the pixel-absent area, measuring brightness values of the pixel-existing area and the pixel-absent area of the display panel, generating updated brightness values by replacing at least one of the brightness values of the pixel-absent area with a suitable value, wherein the suitable value is selected to improve a compression ratio of the mura correction data, generating the mura correction data based on the updated brightness values, and generate compressed mura correction data by compressing the mura correction data; and an interface configured to supply the compressed mura correction data to a display driver configured to drive the display panel using received image data corrected by the mura correction data.

17. The display driver setting apparatus according to claim 16, wherein the processor is further configured to:

generate a test image data corresponding to a test image; and measure the brightness values of the pixel-existing area and the pixel-absent area from a captured image of the display panel, the captured image being captured while the test image is displayed on the display panel, and wherein the suitable value is determined based on a grayscale value described in the test image data.

18. The display driver setting apparatus according to claim 16, wherein the suitable value is associated with a hypothetical pixel defined in the pixel-absent area, and wherein the suitable value is determined based on a position of the hypothetical pixel in a vertical direction of the display panel.

19. The display driver setting apparatus according to claim 16,
wherein the suitable value is associated with a hypothetical pixel defined in the pixel-absent area, and
wherein the suitable value is determined based on a brightness value of a pixel of the pixel-existing area, the pixel being positioned in a horizontal direction with respect to the hypothetical pixel.

20. The display driver setting apparatus according to claim 16,
wherein the suitable value is associated with a hypothetical pixel defined in the pixel-absent area, and
wherein the suitable value is determined as a brightness value of a pixel of the pixel-existing area, the pixel being positioned in a horizontal direction with respect to the hypothetical pixel within a predetermined distance from a boundary between the pixel-existing area and the pixel-absent area.

21. The display driver setting apparatus according to claim 16,
wherein the suitable value is associated with a hypothetical pixel defined in the pixel-absent area, and
wherein the suitable value is calculated through interpolation between brightness values of first and second pixels of the pixel-existing area, the first pixel being positioned in a first direction parallel to a horizontal direction with respect to the hypothetical pixel at a boundary between the pixel-existing area and the pixel-absent area, and the second pixel being positioned in a second direction opposite to the first direction with respect to the hypothetical pixel at a boundary between the pixel-existing area and the pixel-absent area.

22. A display driver, comprising:
a non-volatile memory configured to store compressed mura correction data,
wherein the compressed mura correction data is generated by performing a testing process of a display panel, the testing process comprising:
  distinguishing a pixel-existing area of the display panel and a pixel-absent area of the display panel, comprising:
    comparing brightness measurements obtained from the display panel against a predetermined brightness level while displaying test image data,
    assigning a first region of the display panel where a first subset of the brightness measurements exceeds the predetermined brightness level to the pixel-existing area, and
    assigning a second display region where a second subset of the brightness measurements does not exceed the predetermined brightness level to the pixel-absent area,
  measuring brightness values of the pixel-existing area of the display panel and the pixel-absent area of the display panel,
  generating updated brightness values by replacing at least one of the brightness values of the pixel-absent area with a suitable value,
    wherein the suitable value is selected to improve a compression ratio of the mura correction data,
  generating the mura correction data based on the updated brightness values, and
  compressing the mura correction data;
decompression circuitry configured to generate decompressed mura correction data by decompressing the compressed mura correction data;
image processing circuitry configured to correct an image data based on the decompressed mura correction data; and
driver circuitry configured to drive a display panel based on the corrected image data.

* * * * *